Feb. 21, 1933.　　　　C. I. HESS　　　　1,898,726
STUD DRIVER
Filed June 20, 1932
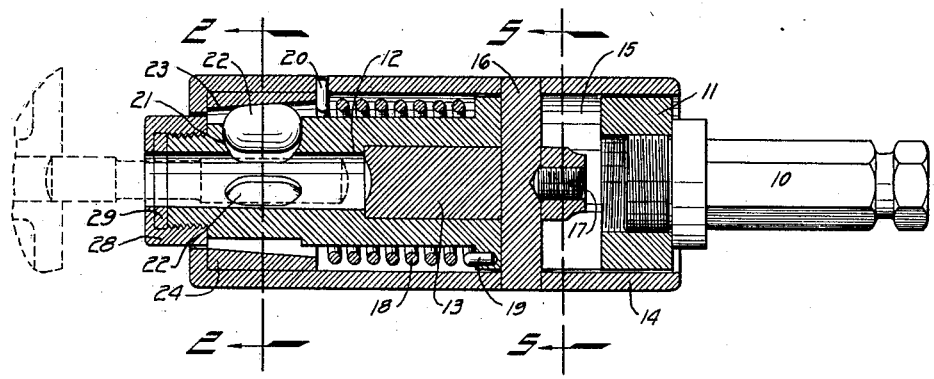
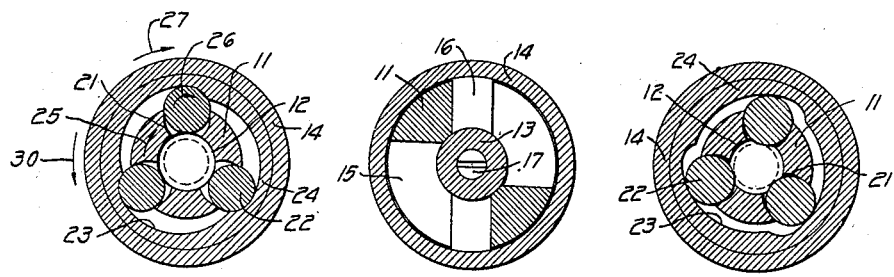
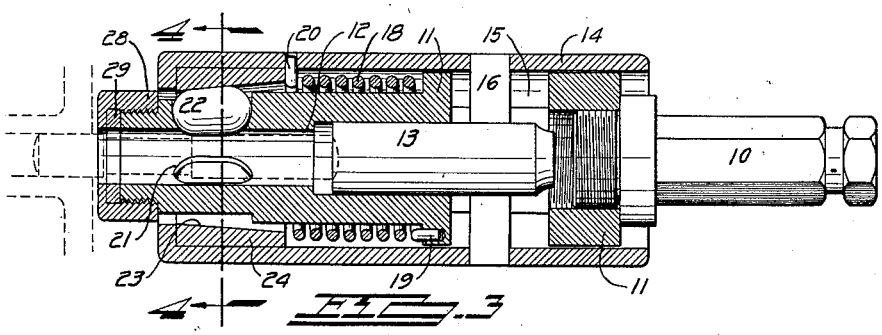
INVENTOR.
C. I. Hess.
BY
ATTORNEY.

Patented Feb. 21, 1933

1,898,726

UNITED STATES PATENT OFFICE

CLAUDE L. HESS, OF DETROIT, MICHIGAN, ASSIGNOR TO FORD MOTOR COMPANY, OF DEARBORN, MICHIGAN, A CORPORATION OF DELAWARE

STUD DRIVER

Application filed June 20, 1932. Serial No. 618,288.

The object of my invention is to provide a stud driver especially adapted for turning in the studs which secure removable cylinder heads to the cylinder blocks of internal-combustion engines.

More specifically, the object of my invention is to provide a stud driver which is adapted to grip the unthreaded portion of such studs while driving them into position and which driver will automatically release itself from the stud when the latter has been screwed down to the proper depth.

The studs used on internal-combustion engines usually consist of steel rods about four or five inches long, each end of which is threaded for a distance of about one inch leaving the center portion thereof without threads. One end of each stud is fixedly screwed down into the cylinder block with the unthreaded portion extending up through the cylinder head and the other threaded end receiving a nut to secure the cylinder head in position. Heretofore, in screwing such studs into cylinder heads on manufacturers' production lines, it had been customary to turn these studs into position by gripping the threaded portion at one end with a special type of threaded chuck. The essential features of this chuck consisted of a nut split radially into three segments which might be clamped down over one threaded end of the stud and locked in this clamped position and then rotated to screw the stud in place. When the stud had reached its desired position the nut was automatically released, that is, the segments of the split nut were moved outwardly in a radial direction so as to clear the outside diameter of the threads thereby allowing the driver to be disengaged from the stud without unscrewing the driving nut therefrom. A disadvantage resulting from the use of such tool was that the nut segments invariably disengaged themselves while the driving torque was impressed thereon thereby distorting the sharp edges of the threads. With my improved device the stud is not gripped on the threads so that no distortion thereof would be expected.

It is, of course, apparent that a clutch comprising a solid nut would not be adaptable for threading in such studs on production lines, first because of the loss in time which would be unavoidable in unscrewing such driving nut from the stud and secondly because about half of the studs so installed would, when such clutch was reversed, unscrew out of the cylinder head instead of out of the chuck. For these reasons some sort of a split chuck has universally been used which automatically spreads radially when the stud has been threaded into its predetermined position.

With these and other objects in view my invention consists in the arrangement, construction and combination of the various parts of my improved device, as described in this specification, claimed in my claims, and illustrated in the accompanying drawing, in which:

Figure 1 shows a longitudinal central sectional view through my improved stud driver, in its inoperable position.

Figure 2 shows a cross sectional view, taken on the line 2—2 of Figure 1.

Figure 3 shows a longitudinal central sectional view, similar to that shown by Figure 1, the parts however being in their operable positions whereby the stud is nonrotatably held therein.

Figure 4 shows a cross sectional view, taken on the line 4—4 of Figure 3, illustrating the operation of the clutch jaws or rollers, and Figure 5 shows a cross sectional view, taken on the line 5—5 of Figure 1.

Referring to the accompanying drawing, I have used the reference numeral 10 to indicate generally a hexagonal shaped shank which is adapted to be nonrotatably received in the ordinary electric or air drill machine. It is immaterial what motive power actuates this device, however, I have found that the ordinary electric drill motor is very suitable for this use. The outer end of this shank is threaded into a driving member 11 so that the shank and driving member rotate as a unit at all times during the operation of the device.

It will be seen from Figure 1 that the driving member 11 is provided with an axial bore 12 extending therethrough and that a plunger 13 is reciprocally mounted in the intermediate portion of this bore, the end opposite the shank 10 being adapted to bear against the end of the stud being driven. A sleeve 14 is reciprocally mounted over the driving member 11 and extends the full length thereof. In order to connect the plunger 13 and sleeve 14, the driving member 11 is provided with a pair of diametrically opposed segmental slots 15 therein and a pin 16, preferably of square cross section, extends through suitable openings in the plunger 13 and sleeve 14 so as to connect the plunger and sleeve against relative reciprocal movement. The pin 16 is secured in the plunger by means of a set screw 17 so that movement of the plunger will reciprocate the sleeve at all times. The length of the slots 15 together with their segmental shape, as shown in Figure 5, allows both considerable rotary and axial relative movement of the parts.

It will be noted from Figure 1 that I have provided a helical spring 18 disposed between the driving member 11 and the sleeve 14, the diameter of the driving member being reduced adjacent thereto to accommodate the spring. One end 19 of the spring is anchored in a suitable opening in the driving member 11 while the other end 20 of the spring is anchored in a suitable opening in the sleeve 14. The spring is stressed to urge the sleeve 14 in the direction shown by arrow 30 in Figure 2. Further, the spring 18 is compressed when assembled in position so that it urges the pin 16 and plunger 13 outwardly to the position shown in Figure 1.

Referring to Figure 2, it will be noted that the outer end of the driving member 11 is provided with three slots 21 extending therethrough in which rollers 22 are disposed. The rollers 22 are tapered from end to end so as to coact over their full length with tapered cam surfaces 23 which are formed in a cam ring 24, this ring being fixedly secured in the outer end of the sleeve 14. The cam surfaces 23 on the cam ring 24 are tapered so that movement of the sleeve towards the right, relative to the rollers 22, will move the rollers inwardly against the stud. It will further be noted that rotation of the cam ring in a clockwise direction, as shown in Figure 2, will also cause the rollers to move into engagement with the stud.

To operate the device the whole unit is pushed down over the stud, the outer end of the stud striking against the plunger 13 and pushing the plunger and sleeve 14 upwardly to the position shown in Figure 3. The spring 18 has up to this time retained the sleeve 14 and cam ring 24 in the positions shown in Figure 2 so that the rollers 22 are disposed in their maximum outward radial positions so far as the cam 23 is concerned, however the taper on the cam 23 through the movement of the sleeve 14 forces these rollers into engagement with the stud. The shank 10 and driving member 11 are, of course, being rotated during this operation so that as soon as the rollers bear against the surface of the stud they tend to roll therearound. The driving member 11 rotating in the direction shown by arrow 25 rotates the rollers 22 bodily around the stud which tends to remain stationary thereby causing the rollers themselves to rotate in the direction shown by arrow 26. Inasmuch as there is the same friction between the cam surfaces 23 and the rollers as between the rollers and the stud, the rotation of the rollers around their own axes rotates the cam ring and sleeve 14 in the direction shown by arrow 27 thereby advancing the sleeve ahead of its former position relative to the driving member. Due to the rise of the cam surfaces 23 the advancement of the cam ring ahead of the driving member tends to squeeze the rollers into tighter engagement with the cam ring to thereby lock the rollers against the stud. This relative rotation of the sleeve 14 is done against the urging of the spring 18. It should be kept in mind that the rotation of the rollers caused by their friction with the stationary stud rotates the cam ring and not the rotation of the cam ring which forces the rollers into engagement with the stud.

I have provided a cap 28 which is threaded on the extreme outer end of the driving member 11 which forms a wear plate for the end of this member. A washer 29 is inserted between the cap and the end of the driving member so that wear on the cap may be compensated for by the insertion of a thicker washer. When the stud has been screwed down to a predetermined depth the cap 28 bears against the member into which the stud is threaded and then upon continued rotation of the device, the stud screws in further so as to pull away from the plunger 13 thereby permitting the spring 18 to extend axially and thus move the sleeve 14 and cam ring 24 towards the left. The gripping action of the rollers 22 is thereby relieved so that the cam ring will snap back into the position shown in Figure 2.

It will be apparent that the operation of the device does not require the starting, stopping or reversing of the driving motor when engaging or disengaging the device from the stud, as the same is accomplished automatically as heretofore described.

It will also be apparent that by reversing the direction of cam faces 23 and tension of the spring 18, that a device for removing studs can be made. Further, that the term stud driver, used in the annexed claims, refers to a driver adapted to either install or remove studs.

Among the many advantages arising from the use of my improved device, it may be well to mention that the stud is gripped on the unthreaded portion thereof so that its screw threads will not be distorted. Still further, the device being entirely automatic is considerably faster in operation than stud drivers with which the applicant is familiar.

Some changes may be made in the arrangement, construction and combination of the various parts of my improved device without departing from the spirit of my invention and it is my intention to cover by my claims such changes as may reasonably be included within the scope thereof.

I claim as my invention:

1. In a stud driver of the character described, a driving member, a clutch mechanism associated with said driving member, said clutch mechanism being actuated by relative axial movement of the stud and driving member in one direction to cause initial frictional engagement of said stud and clutch mechanism and in the opposite direction to release said clutch mechanism from said stud, said clutch being actuated by relative rotation of said stud and driving member to lock said clutch member into nonrotative engagement with said stud.

2. A device, as claimed in claim 1, wherein the clutch mechanism comprises a plurality of rollers on coacting cam faces.

3. In a stud driver of the character described, a driving member encircling said stud having a clutch mechanism associated therewith, means actuated by relative axial movement of the stud and driving member in one direction for causing initial frictional engagement of said stud and clutch mechanism, said means being actuated by relative rotation of said stud and driving member so as to nonrotatively lock said clutch mechanism into engagement with said stud, and means actuated by relative axial movement of said stud and driving member in the opposite direction for releasing said clutch mechanism from said stud.

4. In a stud driver of the character described, a driving member, a roller clutch associated with said driving member, means actuated by relative axial movement of the stud and driving member in one direction for causing initial frictional engagement of said stud and rollers, said means being actuated by relative rotation of said driving member and stud so as to lock said rollers into engagement with said stud, and means actuated by relative axial movement of said stud and driving member in the opposite direction for releasing said rollers from said locking engagement.

5. In a device of the character described, a driving member, a plurality of clutch rollers associated with said driving member, a cam ring encircling said clutch rollers, said cam ring being so constructed that axial movement thereof in one direction relative to said rollers will initially engage said rollers with the stud and relative rotation of said stud and driving member will rotate said cam ring so as to lock the rollers into engagement with the stud, and means coacting with the head of said stud for axially shifting said cam ring for the purpose described.

6. A device, as claimed in claim 5, in which the clutch rollers and cam ring are tapered to effect the initial engagement of the rollers by the axial shifting of the clutch ring.

7. In a device of the character described, a driving member having an axial bore therethrough, a plurality of clutch rollers associated with said driving member, a cam ring encircling said clutch rollers having cam surfaces thereon, said cam surfaces being so generated that relative axial movement of the cam ring and rollers will initially engage said rollers with the stud to be driven and relative rotary movement of said stud and driving member will rotate said cam ring so as to nonrotatively lock the rollers into engagement with the stud, and means coacting with the head of said stud for axially shifting said cam ring relative to said rollers for the purpose described.

8. In a device of the character described, a driving member having an axial bore extending therethrough, a plurality of clutch rollers associated with the outer end of said driving member, a cam ring encircling said clutch rollers, said cam ring being so generated that relative axial movement of the cam ring and rollers will initially engage said rollers with the stud to be driven and relative rotary movement of said stud and driving member will rotate said cam ring so as to nonrotatively lock the rollers into engagement with the stud, a plunger reciprocally mounted in said driving member in position to coact with the head of the stud being driven, and means connecting said plunger and cam ring whereby the cam ring will be reciprocated by said plunger.

9. In a device of the character described, a driving member having an axial bore therethrough adapted to receive the stud to be driven, a plurality of clutch rollers disposed in the stud receiving portion of said driving member, a cam ring encircling said clutch rollers, said cam ring being so generated that either axial or rotary movement thereof relative to said driving member will engage the clutch rollers with said stud, and means actuated by the head of the stud being driven for causing said axial movement, the rotary movement of the driving member around the stud causing said rotary movement of the cam ring to thereby nonrotatively lock the rollers into engagement with the stud for the purpose described.

10. In a device of the character described, a driving member having an axial bore extending therethrough one end of which is adapted to loosely receive the stud to be driven, a plurality of tapered clutch rollers associated with the stud receiving end of said driving member, a plunger reciprocally mounted in the opposite end of said driving member, a sleeve reciprocally and rotatably mounted over said driving member, said driving member having an enlarged transverse opening therethrough in which a pin extends, said pin fixedly connecting said plunger and sleeve whereby unitary movement of the plunger and the sleeve is obtained in both axial and rotary directions relative to said driving member, a cam ring fixedly secured in the end of said sleeve adjacent to said rollers, said cam ring being tapered, whereby reciprocation of said plunger caused by its engagement with the end of said stud will reciprocate said cam ring to initially engage the clutch rollers with said stud and rotation of said clutch rollers due to their frictional engagement with said stud will rotate said cam ring so as to lock themselves into engagement with said stud.

CLAUDE I. HESS.